Patented Feb. 24, 1948

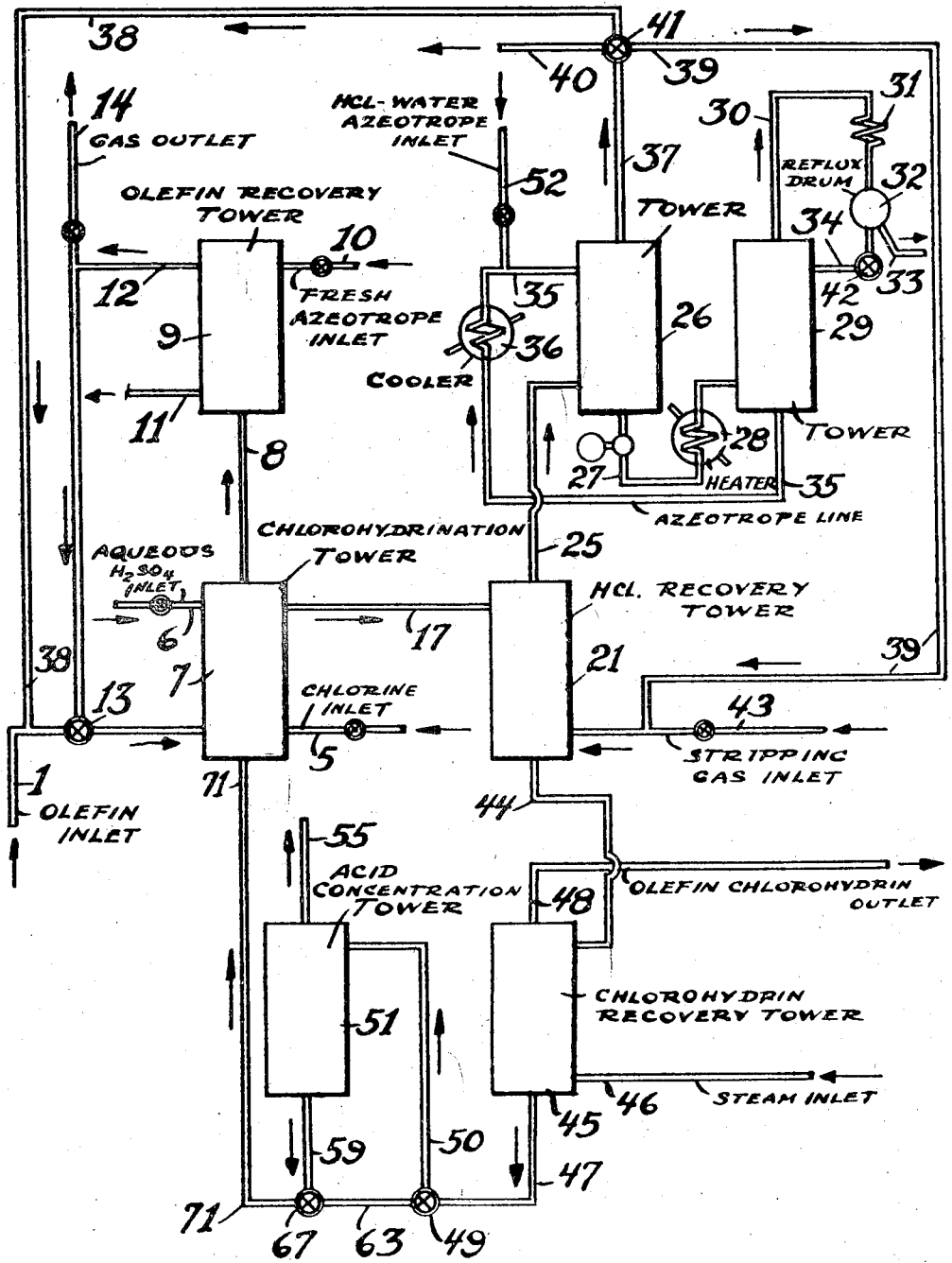

2,436,591

UNITED STATES PATENT OFFICE 2,436,591

PROCESS FOR MAKING OLEFIN CHLOROHYDRINS

Charles E. Morrell, Westfield, James K. Small, Union, and Howard L. Yowell, Elizabeth, N. J., assignors to Standard Oil Development Company, a corporation of Delaware Application August 24, 1945, Serial No. 612,458

20 Claims. (Cl. 260—634)

1

The present invention relates to a method of making olefin chlorohydrins from olefins, and particularly to a method of making olefin chlorohydrins from olefins by a process wherein anhydrous HCl is directly recovered as a valuable by-product.

Heretofore olefin chlorohydrins have been made by various methods; among which is one wherein hypochlorous acid is prepared separately from mercuric oxide and chlorine and is added to the olefinic hydrocarbon with agitation and cooling and another wherein olefin gases react with hypochlorous acid in the presence of excess steam and water at a temperature of about 100° C., but the most successful method has been one wherein chlorine is pre-dissolved in an aqueous medium and then the aqueous chlorine solution is flowed concurrently with the olefin gas through an appropriate reaction vessel. When chlorine is dissolved in aqueous solution, presumably hypochlorous acid reacts with the olefin; the products of the reaction are olefin chlorohydrin, HCl and some olefin dichloride which is formed by direct addition of chlorine to the olefin. The HCl produced has heretofore been available as a by-product only in the form of the dilute aqueous acid as it is obtained in the reaction or concentrated by distillation procedure, which gives a constant boiling aqueous solution of HCl known as the azeotrope but no anhydrous HCl. Anhydrous HCl has a commercial value greater than that of the azeotrope because of its greater utility.

It has been discovered that anhydrous HCl can be substantially recovered as a valuable by-product and a high yield of olefin chlorohydrin obtained by conducting the chlorohydrination reaction in an aqueous sulfuric acid medium. For example, by conducting the chlorohydrination reaction in sulfuric acid of sufficient strength, the HCl which is removed from the resulting solution by heating or by the action of a stripping gas has a higher ratio of HCl to water than that in the HCl-water azeotrope; it is then possible by simple fractionation to obtain anhydrous HCl from this product.

The drawing is a flow diagram representing a preferred embodiment of the invention.

Stated broadly, the invention is practiced by contacting chlorine and olefin with aqueous sulfuric acid. This may be accomplished by contacting chlorine with aqueous sulfuric acid in one vessel followed by contacting the solution with an olefin in a second vessel or by contacting both chlorine and olefin with aqueous sulfuric acid in a chlorohydrination tower. The HCl formed by

2 the reaction is removed from the reaction mixture in an HCl recovery tower by appropriate means such as stripping the reaction mixture with an inert gas. The proportion by weight of HCl to water in the hydrochloric acid removed by the stripping gas is greater than one to four, the composition of the HCl—H$_2$O azeotrope at atmospheric pressure. Olefin chlorohydrin is recovered in a chlorohydrin recovery tower by extraction or by means of a distillation which removes the chlorohydrin with some water. The distillation may be at atmospheric pressure or at reduced pressure or by means of steam. If it is desired to concentrate the sulfuric acid, in the event that it is diluted in the removal of chlorohydrin, this is done by a distillation step in an acid concentrator, but the acid may be reintroduced directly into the vessel wherein chlorine is introduced or into the chlorohydrination tower. The invention is practiced in a continuous manner as there is no substantial loss of sulfuric acid in any of the steps and the concentration of recycled sulfuric acid can be adjusted in the acid concentrator to any strength desired in the chlorohydrination tower.

In order that the process may be more clearly understood, reference is made to the drawing which is a flow diagram showing one arrangement of apparatus suitable for practicing the invention when a gaseous olefin is chlorohydrinated. Gaseous olefin, chlorine and aqueous sulfuric acid are introduced into chlorohydrination tower 7 at 1, 5 and 6 respectively. The chlorohydrination tower contains aqueous sulfuric acid when olefin and chlorine are introduced. Any unreacted olefine passes out of this tower through 8 and carries with it some HCl into the olefin recovery tower 9 where the gases bubble through HCl azeotrope, at a temperature substantially below its boiling point, which dissolves the HCl present in the gases. Fresh azeotrope may be added at 10 and azeotrope containing dissolved HCl may be withdrawn at 11. The amount of HCl removed from the chlorohydrination tower in the exit hydrocarbon stream will depend on the strength of the sulfuric acid used in this tower. The gas from which HCl has been removed leaves the olefin recovery tower 9 through line 12 and may be reintroduced into line 1 through valve 13. A portion or all of this gas may be removed through 14 in order to remove inert gases such as paraffins, etc., which may be present in the olefin feed gas. The aqueous sulfuric reaction medium containing the products of the reaction is introduced through line 17 into the HCl recovery tower 21 and the HCl is removed substantially from the reaction mixture by passing a stripping gas through line 43 into the tower. The olefinic feed gas can be used as a stripping gas, especially when the olefin present is not a tertiary olefin. The proportion by weight of HCl to water in the hydrochloric acid removed by the stripping gas is greater than one to four. The stripping gas now containing HCl leaves the tower through line 25 and enters tower 26 where it meets HCl-water azeotrope which enters tower 26 through lines 52 and 35 at a temperature substantially below the boiling point of the azeotrope, preferably at 30 to 50° C. The HCl present in the gas is dissolved in the azeotrope and the stripping gases pass out of tower 26 through line 37 and valve 41. The stripping gases may be discarded through 40 or returned by lines 39 and 43 for reuse in tower 21. If feed gas was used as a stripping gas it can be returned to line 1 through line 37, valve 41 and line 38. The azeotrope containing dissolved HCl is removed from tower 26 through line 27 and passed through heater 28 and into tower 29 where heating means raises the temperature of the azeotrope which results in the dissolved HCl being expelled in a substantially anhydrous form through line 30 and condenser 31 to reflux drum 32 from which reflux is returned to tower 29 through valve 42 and line 34. The anhydrous HCl is passed out of the system through line 33. The azeotrope which has been freed in tower 29 from dissolved HCl is recycled to tower 26 through line 35 and cooler 36. The reaction mixture, substantially reduced in HCl content, is introduced into the chlorohydrin recovery tower 45 through line 44 and in this tower olefin chlorohydrin is removed through line 48 by a distillation process, which is preferably conducted under vacuum. Steam may be introduced into tower 45 through line 46 where it is found desirable to remove the olefin chlorohydrin by steam distillation. The aqueous sulfuric acid from which olefin chlorohydrin has been removed is withdrawn from tower 45 through line 47 and if its strength is such that it can be used again in the chlorohydrination tower 7, it is then introduced into that tower by passing through valve 49, line 63, valve 67 and line 71; but if it is desirable to concentrate the sulfuric acid, this is done in the acid concentration tower 51 into which it is introduced by passing through valve 49 and line 50, water vapor being withdrawn through line 55. The acid which has been concentrated to the desired strength is then introduced into the chlorohydrination tower 7 by passing through line 59, valve 67 and line 71.

Aqueous sulfuric acid having 20–80% by weight of sulfuric acid may be used in the chlorohydrination tower. The proportion of olefin to chlorine in the chlorohydrination tower is adjusted such that there is never an excess of chlorine over the amount required to react with the olefin present, according to the following equations:

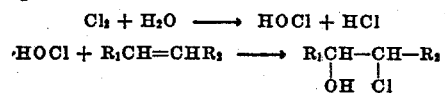

where $R_1$ is hydrogen or alkyl and $R_2$ is hydrogen or alkyl. It is preferred to maintain the ratio of chlorine to olefin such that there is an excess of olefin present as this serves to help prevent the formation of alkyl dichlorides and other by-products of the reaction. The temperature in the chlorohydrination tower may be from the freezing point of the solution to 50° C., but the preferred range is from 0° to 30° C.

The olefin chlorohydrin is recovered from the sulfuric acid solution by distillation means such as distillation by the direct application of heat or by steam distillation. These are preferably conducted under vacuum, especially when using sulfuric acid concentrations above about 40 to 50 wt. percent, in order to avoid decomposition of the chlorohydrin. The olefin chlorohydrin may also be recovered by extraction of the sulfuric acid solution with selective solvents such as aliphatic ethers such as diethyl ether and diisopropyl ether.

It is possible that small amounts of HCl may be present in the sulfuric acid that is returned to the chlorohydrination tower because it may not be feasible to remove all of the HCl in the steps preceding. The HCl concentration in the reaction liquid in the chlorohydrination tower should be kept below about one mole per liter to suppress the formation of olefin dichloride. The concentration of olefin chlorohydrin is also preferably kept below about 1.0 to 1.5 moles per liter in order to suppress the oxidative action of chlorine on the olefin chlorohydrin.

Although the drawing represents one flow system according to which the invention may be practiced, the practice of the invention is not to be restricted to that system but it may be practiced successfully in other systems, such as one in which an initial charge of dilute sulfuric acid is alternately contacted with chlorine and olefin in separate towers and wherein the sulfuric acid is first contacted with chlorine, the sulfuric acid containing dissolved chlorine then being carried to a second contacting tower where it is contacted with olefin and wherein the said olefin flows countercurrently or concurrently with the said sulfuric acid solution containing dissolved chlorine.

It is important that when a gas such as chlorine or a gaseous olefin is introduced into the liquid phase that the gas be finely dispersed and this can be accomplished in a number of ways, one preferred being to pass the gas through a porous alundum disk.

The following examples represent some applications of this process to the manufacture of propylene chlorohydrin. It is not intended, however, that the process be restricted to the manufacture of propylene chlorohydrin but these examples are given to show specific embodiments of the invention by way of illustration.

*Example 1*

An initial charge of 65 wt. per cent $H_2SO_4$ was contacted with finely dispersed chlorine in a contacting tower wherein the chlorine flowed countercurrently to the sulfuric acid. The sulfuric acid solution containing dissolved chlorine was then conveyed into a second tower where a finely dispersed stream of propylene, in excess of a molal proportion to the dissolved chlorine, was introduced and in this tower the propylene flowed concurrently with the liquid. The initial charge was continuously recirculated through the two towers until a chlorohydrin concentration of one mole/liter had been reached. The temperature of the circulating acid was maintained at 10–11° C. Anhydrous HCl can be recovered from unreacted propylene by passing the gases into HCl-azeotrope, and then distilling off anhydrous HCl from this enriched solvent. Additional HCl can be similarly stripped from the sulfuric acid solution after the chlorohydrination reaction. At a final chlorohydrin concentration of one mole/liter only 5% propylene dichloride, based on chlorohydrin, had been produced by the addition side reaction. The major part of the chlorohydrin was volatilized from the $H_2SO_4$ by a steam stripping operation in which the acid solution, without preheating, was passed into the top of a column and passed down it countercurrent to steam supplied at the bottom. This steam distillate was an aqueous solution of propylene chlorohydrin of better than 99% purity. Attempts to distill the chlorohydrin directly from the reaction mixture at atmospheric pressure, without dilution or the use of a stripping gas, resulted in such extensive reaction of the acid and chlorohydrin that only decomposition products were distilled, and the acid solution rapidly became black.

*Example 2*

An initial charge of $H_2SO_4$ (25% by wt.) was contacted at a temperature of 10–11° C. with finely dispersed chlorine fed at a rate to nearly saturate the solution. The $H_2SO_4$ solution containing dissolved chlorine was fed into the bottom of a second tower where propylene was introduced in a finely divided state and in amount in excess of that required to react with all of the chlorine dissolved in the solution. The solution was recirculated between the towers until it acquired a concentration of olefin chlorohydrin of one mole/liter. Under these conditions 95 mole per cent of the chlorine was consumed in the chlorohydrination reaction and only 5% was consumed in an addition reaction to produce propylene dichloride. The chlorohydrin was separated from this reaction mixture without decomposition by a single distillation at atmospheric pressure.

While the present invention has been described in the above examples with specific reference to propylene, it also applies to the preparation of chlorohydrins from other olefins, both gaseous and liquid. In working with olefins, which are more reactive with sulfuric acid, it is desirable to use sulfuric acid of sufficiently low strength to avoid substantial hydration or sulfation of the olefin at the reaction temperature of the chlorohydrination. For example, with olefins such as ethylene, propylene and the n-butenes sulfuric acid concentrations up to about 80% may be used, while with tertiary olefins such as isobutylene, the sulfuric acid concentration should be preferably below about 50%.

What is claimed is:

1. An improved process for making olefin chlorohydrins which comprises reacting chlorine with an olefin in the presence of a 20–80% by weight aqueous solution of sulfuric acid, separating HCl from the reaction mixture and then separating the olefin chlorohydrin at a temperature below its decomposition temperature.

2. An improved continuous process for making olefin chlorohydrins which comprises continually passing chlorine and an olefin into a 20–80% by weight aqueous solution of sulfuric acid, continuously removing the reaction mixture from the reaction zone, separating HCl from the reaction mixture, separating the olefin chlorohydrin at a temperature below its decomposition temperature and continually returning the aqueous sulfuric acid to the reaction zone.

3. An improved process for making olefin chlorohydrins which comprises passing olefin and chlorine separately into a 20–80% by weight aqueous solution of sulfuric acid at a temperature of from the freezing point of the reaction mixture to 50° C., separating HCl from the reaction mixture and then separating the olefin chlorohydrin at a temperature below its decomposition temperature.

4. Process according to claim 3 in which the olefin is propylene.

5. Process according to claim 3 in which the reaction temperature is 10° C.

6. Process according to claim 3 in which the strength of the sulfuric acid is 65% by weight.

7. Improved process for making olefin chlorohydrins which comprises passing gaseous chlorine and olefin separately into a 20–80% by weight aqueous solution of $H_2SO_4$ at a temperature of from the freezing point of the solution to 50° C. in a chlorohydrination tower, removing part of the HCl formed in the said chlorohydrination tower in an HCl recovery tower by passing through the solution a stripping gas, removing the olefin chlorohydrin in a chlorohydrin recovery tower by passing steam through the solution, concentrating the $H_2SO_4$ to a degree that the per cent by weight of $H_2SO_4$ is from 20–80%, and recycling the concentrated $H_2SO_4$ into the chlorohydrination tower.

8. Process according to claim 7 in which the olefin is propylene.

9. Process according to claim 7 in which the reaction temperature is 10° C.

10. Process according to claim 7 in which the initial concentration of sulfuric acid is 65% by weight and in which the concentration of the recycled sulfuric acid is 65% by weight.

11. An improved process for making olefin chlorohydrins which comprises reacting chlorine with an olefin in the presence of a 20–80% by weight aqueous solution of sulfuric acid, separating aqueous HCl having a proportion by weight of HCl to water greater than one to four from the reaction mixture and then separating the olefin chlorohydrin at a temperature below its decomposition temperature.

12. An improved continuous process for making olefin chlorohydrins which comprises continually passing chlorine and an olefin into a 20–80% by weight aqueous solution of sulfuric acid, continuously removing the reaction mixture from the reaction zone, separating aqueous HCl having a proportion by weight of HCl to water greater than one to four from the reaction mixture, distilling off the olefin chlorohydrin below its decomposition temperature and continually returning the aqueous sulfuric acid to the reaction zone.

13. Improved process for the manufacture of olefin chlorohydrins comprising passing chlorine into dilute sulfuric acid in a first vessel until the solution is saturated with chlorine, introducing the dilute sulfuric acid solution saturated with chlorine into a second vessel, reacting the solution in the second vessel with gaseous olefin, maintaining the temperature in the second vessel between the freezing point of the solution and 50° C., separating anhydrous HCl from the reaction mixture and then distilling off the olefin chlorohydrin below its decomposition temperature.

14. Improved process for the manufacture of olefin chlorhydrins comprising passing separately into a 20–80% by weight aqueous solution of sulfuric acid gaseous olefin and gaseous chlorine at a reaction temperature of from the freezing point of the solution to 50° C. in a chlorohydrination zone separating from the reaction mixture substantially all of the hydrochloric acid present in its anhydrous form in a hydrochloric acid recovery zone, distilling off the olefin chlorohydrin below its decomposition temperature in a chlorohydrin recovery zone and returning the sulfuric acid to the chlorohydrination zone.

15. Process according to claim 14 in which the anhydrous hydrochloric acid is removed at the hydrochloric acid recovery zone by passing through the said zone an inert stripping gas.

16. Process according to claim 14 in which the concentration of the dilute sulfuric acid from which hydrochloric acid and olefin chlorohydrin have been removed is adjusted in an acid concentration zone to a strength of from 20–80% by weight.

17. Improved process for the manufacture of olefin chlorohydrins comprising passing separately into a 20–80% by weight aqueous solution of sulfuric acid gaseous olefin and gaseous chlorine at a reaction temperature of from the freezing point of the solution to 50° C. in a chlorohydrination zone and maintaining the proportion of olefin to chlorine such that there is always an excess of olefin over that required to react with all of the chlorine, whereby some of the hydrochloric acid formed by the reaction is carried out of the chlorohydrination zone by the excess olefins and recovering it as anhydrous HCl, introducing the reaction mixture into a hydrochloric acid recovery zone, passing through this zone inert stripping gas whereby the hydrochloric acid is substantially all removed from the solution as HCl mixed with stripping gas, recovering anhydrous HCl from the stripping gas, introducing the olefin chlorohydrin-sulfuric acid solution substantially reduced in hydrochloric acid into an olefin chlorohydrin recovery zone, passing steam through the olefin chlorohydrin recovery zone whereby the olefin chlorohydrin is removed and the sulfuric acid is diluted, introducing the dilute sulfuric acid into an acid concentrating zone, concentrating the sulfuric acid by distillation of the water until the concentration of sulfuric acid is 20–80% by weight and introducing this acid into the chlorohydrination zone.

18. Improved process for the manufacture of olefin chlorhydrins comprising passing separately into a 20–80% by weight aqueous solution of sulfuric acid gaseous olefin and gaseous chlorine at a reaction temperature of from the freezing point of the solution to 50° C. in a chlorohydrination zone and maintaining the proportion of olefin to chlorine such that there is always an excess of olefin over that required to react with all of the chlorine, whereby some of the hydrochloric acid formed by the reaction is carried out of the chlorohydrination zone by the excess olefins and recovering it as anhydrous HCl, introducing the reaction mixture into a hydrochloric acid recovery zone, passing through this zone inert stripping gas whereby the hydrochloric acid is substantially all removed from the solution as HCl having a proportion by weight of HCl to water greater than one to four mixed with stripping gas, contacting the aqueous hydrochloric acid mixed with stripping gas with HCl-water azeotrope in a separate zone, whereby the HCl is dissolved in the azeotrope, introducing the azeotrope containing dissolved HCl into another zone and applying heat whereby the dissolved HCl is removed as substantially anhydrous HCl, introducing the olefin chlorohydrin-sulfuric acid solution substantially reduced in hydrochloric acid into an olefin chlorohydrin recovery zone, passing steam through the olefin chlorohydrin recovery zone whereby the olefin chlorohydrin is removed and the sulfuric acid is diluted, introducing the dilute sulfuric acid into an acid concentration zone, concentrating the sulfuric acid by distillation of the water until the concentration of sulfuric acid is 20–80% by weight and introducing this acid into the chlorohydrination zone.

19. Process according to claim 17 in which the inert stripping gas is methane.

20. Process according to claim 17 in which the inert stripping gas is steam.

CHARLES E. MORRELL.
JAMES K. SMALL.
HOWARD L. YOWELL.

REFERENCES CITED

The following references are of record in the file of this patent:

UNITED STATES PATENTS

| Number | Name | Date |
|---|---|---|
| 2,107,789 | Harford | Feb. 8, 1938 |
| 2,378,104 | Reed | June 12, 1945 |